(12) United States Patent
Gaiser (10) Patent No.: US 10,190,460 B2
(45) Date of Patent: Jan. 29, 2019

(54) DEVICE AND METHOD FOR RELEASE OF REACTANT INTO THE EXHAUST GAS STREAM OF AN INTERNAL COMBUSTION ENGINE

(71) Applicant: Eberspächer Exhaust Technology GmbH & Co. KG, Neunkirchen (DE)

(72) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 62 days.

(21) Appl. No.: 15/299,742

(22) Filed: Oct. 21, 2016

(65) Prior Publication Data

US 2017/0114689 A1 Apr. 27, 2017

(30) Foreign Application Priority Data

Oct. 23, 2015 (DE) .................. 10 2015 118 147

(51) Int. Cl.
*F01N 3/20* (2006.01)

(52) U.S. Cl.
CPC ............ *F01N 3/208* (2013.01); *F01N 3/2066* (2013.01); *F01N 2610/02* (2013.01); *F01N 2610/10* (2013.01); *F01N 2610/105* (2013.01); *F01N 2610/107* (2013.01); *F01N 2610/144* (2013.01); *F01N 2610/1406* (2013.01); *F01N 2610/1433* (2013.01); *F01N 2610/1453* (2013.01); *F01N 2610/1486* (2013.01); *F01N 2900/1808* (2013.01); *F01N 2900/1811* (2013.01); *Y02T 10/24* (2013.01)

(58) Field of Classification Search
CPC ................... F01N 3/2066; F01N 3/208; F01N 2610/1433; F01N 2610/144; F01N 2610/1446; F01N 2610/1473; F01N 2900/1808; F01N 2900/1822
See application file for complete search history.

(56) References Cited

U.S. PATENT DOCUMENTS

| 2008/0014103 | A1 | 1/2008 | Cooke |
| 2009/0025373 | A1 | 1/2009 | Buerglin et al. |
| 2014/0227120 | A1* | 8/2014 | Landes ............... F01N 3/24 417/437 |
| 2015/0184570 | A1 | 7/2015 | Haeberer |

FOREIGN PATENT DOCUMENTS

| CN | 101405489 A | 4/2009 |
| CN | 103097681 A | 5/2013 |
| CN | 103782002 A | 5/2014 |
| CN | 104350251 A | 2/2015 |

(Continued)

*Primary Examiner* — Jonathan Matthias
(74) *Attorney, Agent, or Firm* — McGlew and Tuttle, P.C.

(57) ABSTRACT

A device for releasing reactant (R) into the exhaust gas stream (A) of an internal combustion engine, includes a reactant injection unit (20), a reactant delivery unit (12) for delivering reactant (R) from a reactant reservoir (14) to the reactant injection unit (20), and a heating unit (18) for heating reactant (R) delivered by the reactant delivery unit (12) to the reactant injection unit (20). The reactant injection unit (20) is switchable as a function of a reactant pressure generated by the reactant delivery unit (12) between an open state for releasing reactant (R) and a locked state for preventing the release of reactant.

24 Claims, 3 Drawing Sheets

(56) References Cited

FOREIGN PATENT DOCUMENTS

| | | |
|---|---|---|
| DE | 10 2004 034 231 A1 | 2/2006 |
| DE | 10 2004 048 075 A1 | 4/2006 |
| DE | 10 2006 049 591 A1 | 5/2007 |
| DE | 10 2006 012855 A1 | 9/2007 |
| DE | 10 2006 019 051 A1 | 10/2007 |
| DE | 10 2006 053558 A1 | 5/2008 |
| DE | 10 2007 034314 A1 | 1/2009 |
| EP | 1 878 920 A1 | 1/2008 |
| EP | 2 375 054 A1 | 10/2011 |
| EP | 2375054 B1 | 6/2013 |
| JP | H05 59933 A | 3/1993 |
| WO | 2008/058635 A1 | 5/2008 |
| WO | 2013/178384 A1 | 12/2013 |

* cited by examiner

DEVICE AND METHOD FOR RELEASE OF REACTANT INTO THE EXHAUST GAS STREAM OF AN INTERNAL COMBUSTION ENGINE

CROSS REFERENCE TO RELATED APPLICATIONS

This application claims the benefit of priority under 35 U.S.C. § 119 of German Application 10 2015 118 147.9 filed Oct. 23, 2015, the entire contents of which are incorporated herein by reference.

FIELD OF THE INVENTION

The present invention pertains to a device for the release of reactant into the exhaust gas stream of an internal combustion engine, comprising a reactant injection unit, a reactant delivery unit for delivering reactant from a reactant reservoir to the reactant injection unit and a heating unit for heating reactant delivered by the reactant delivery unit to the reactant injection unit. Further, the present invention pertains to a method, with which reactant can be released into the exhaust gas stream of an internal combustion engine by means of such a device.

BACKGROUND OF THE INVENTION

A device for releasing reactant into the exhaust gas stream of an internal combustion engine is well known from DE 10 2006 049 591 A1. The reactant to be released by this device is a urea solution. In order to mix a urea solution delivered by means of a reactant delivery unit to a reactant injection unit with the exhaust gas stream as efficiently as possible, the reactant delivered in the direction towards the reactant injection unit is heated, for example, to a temperature of about 200° C., in this prior-art device. At the same time, the reactant fed in liquid form into the exhaust gas stream before release is set under such high pressure that an evaporation of reactant before the release of reactant into the exhaust gas stream cannot occur. Such a device utilizes the effect that during the release of reactant into the exhaust gas stream, which reactant is heated and at first under increased pressure, a spontaneous expansion, which leads to a spontaneous evaporation of the reactant, occurs, on the one hand, and, on the other hand, leads to very fine reactant droplets of the portion of the reactant which did not spontaneously evaporate, as a result of which a very efficient and fine mixing of the reactant with the exhaust gas of an internal combustion engine flowing in an exhaust gas duct system is achieved.

SUMMARY OF THE INVENTION

An object of the present invention is to provide a device and a method for releasing reactant into the exhaust gas stream of an internal combustion engine, with which in case of a structurally simple configuration, an efficient mixing of the reactant with the exhaust gas of an internal combustion engine receiving this reactant can be achieved.

According to a first aspect, this object is accomplished by a device for releasing reactant into the exhaust gas stream of an internal combustion engine, comprising a reactant injection unit, a reactant delivery unit for delivering reactant from a reactant reservoir to the reactant injection unit and a heating unit for heating reactant delivered by the reactant delivery unit to the reactant injection unit.

In this case, provisions are further made for the reactant injection unit to be switchable as a function of a reactant pressure generated by the reactant delivery unit between an open state for releasing reactant and a locked state for preventing the release of reactant.

In the configuration according to the present invention, a passively operating reactant injection unit is used, i.e., a reactant injection unit, which does not have to be actuated for carrying out injection operations itself. Rather, the reactant injection unit is automatically brought into the open state as a function of the reactant pressure generated by means of the reactant delivery unit in order to release reactant into the exhaust gas stream, namely if the reactant pressure exceeds a switching pressure of the reactant injection unit. The reactant injection unit spontaneously returns into the locked state after dropping below the switching pressure again. Thus, it can be ensured alone by setting the reactant pressure by means of corresponding actuation of the reactant delivery unit that not only is an evaporation of reactant still prevented before release into the exhaust gas stream, but also that the reactant injection unit is transferred into its open state for releasing the reactant into the exhaust gas stream. This makes it possible, by heating the reactant by means of the heating unit to a temperature, which under normal conditions, i.e., under normal pressure, would also result in an evaporation of the reactant, that the above-described effect of spontaneous evaporation or generation of a very fine reactant spray upon release from the reactant injection unit can be utilized. Consequently, such a device may already be used even at comparatively low exhaust gas temperatures, which would otherwise not be suitable for a sufficient evaporation of reactant. An improved conversion of a reactant, which is configured, for example, as a urea/water solution, into ammonia, in conjunction with an improved NOx conversion and a lower consumption of reactant in case of a simultaneously enabled lower volume of a catalytic converter provided in the exhaust gas duct system of combustion exhaust gases of an internal combustion engine, is also achieved in case of using the device according to the present invention. Due to the generation of very fine reactant droplets occurring in addition to the spontaneous evaporation of reactant, a faster evaporation of the reactant released in droplet form is also achieved because of the improved surface/volume conditions, since the weight of the droplets to be heated is proportional to the volume thereof. Further technical steps supporting the mixing of the reactant with the exhaust gases routed in the exhaust gas stream, e.g., a compressed air support during the spray generation or the mixing by means of mixing elements provided in the exhaust gas stream, can thus be omitted at least in part.

The reactant injection unit may comprise a locking element adjustable between a locked position and an open position as a function of the reactant pressure for switching over between the locked state and the open state.

To be able to provide an interaction of the locking element with the reactant causing the switching over between the locked state and the open state in a simple manner, it is suggested that the locking element have a pressurization surface exposed to the reactant pressure, or/and that a prestressing unit, preferably a prestressing spring, for prestressing the locking element in its locked position against the reactant pressure acting on a pressurization surface of the locking element exposed to the reactant pressure, be associated with the locking element.

For preventing a release of reactant in the locked state, on the one hand, and, on the other hand, for releasing the reactant stream in the open state, it is suggested that a locking element seat with a locking element seat closing area be associated with the locking element, and that when the locking element is positioned in the locked position, the locking element with a locking element closing area is in contact with the locking element seat closing area in an essentially fluid-tight manner and when the locking element is positioned in the open position, a flow-through area is formed for the reactant between the locking element and the locking element seat.

In this case, provisions may be made according to an embodiment of the present invention for no area with greater flow resistance for the reactant than in the flow-through area to follow the flow-through area in the reactant injection unit, when the locking element is positioned in the open position. In this embodiment, the effect that no residual volume of reactant remains following the flow-through area, in which an evaporation of reactant leading to byproducts can already take place in the area of the reactant injection unit before the reactant is completely expanded and introduced into the exhaust gas stream, is advantageously utilized.

In an alternative embodiment, provisions may be made for the reactant injection unit to have a reactant release nozzle unit, arranged downstream of the reactant flow-through area, with greater flow resistance for the reactant than in the flow-through area. This embodiment variant utilizes the especially advantageous aspect that the release characteristic, especially the formation of spray mist, can be affected primarily due to the configuration of the reactant release nozzle unit and is affected to a lesser extent, for example, by the actually present reactant pressure. A mostly identical release characteristic for a wide variety of operating states can thus be achieved essentially independently of the reactant pressure and thus, for example, also essentially independently of the temperature of the reactant.

In order to be able to deliver the reactant to the reactant injection unit in a reliable manner, it is suggested that the reactant delivery unit comprise a first reactant pump for delivering reactant to the reactant injection unit, the first reactant pump being configured to generate a reactant pressure lying above a switching pressure for switching the reactant injection unit from the locked state into the open state.

The reactant pump may hereby be configured, for example, as a reciprocating piston pump, which makes it possible to set the pressure conditions and the quantity of released reactant by means of a defined setting of the number of strokes and of the rate of motion of the piston. According to another advantageous aspect, a nonreturn valve, which is arranged downstream of the reactant pump and upstream of the heating unit, may be associated with the first reactant pump in order to prevent a backflow of the reactant. For example, this nonreturn valve may be integrated into the output area of the reactant pump.

The reactant delivery unit of the device configured according to the present invention may comprise, furthermore, a second reactant pump for providing reactant with a base pressure lying below the switching pressure and above a vapor pressure of the reactant in the area of the heating unit. Thus, it can be ensured, in principle, by means of this second reactant pump that the reactant in the area of the device according to the present invention is kept under sufficiently high pressure, so that an evaporation of reactant in the device itself is prevented. The first reactant pump, which must thus operate essentially only in release phases, in which reactant shall actually be introduced into the exhaust gas stream, generates the then necessary higher pressure for transferring the reactant injection unit into its open state.

The second reactant pump may be configured, for example, as a gear pump, i.e., it may, in principle, be configured as a pump that is suitable for providing the base pressure in an essentially continuous delivery or pumping operation. The, for example, intermittent operation of the first reactant pump in release phases can then be superimposed on this continuous operation of the second reactant pump.

In order to ensure that the reactant pressure generated by means of the second reactant pump does not exceed the base pressure, it is suggested that an overpressure valve, arranged downstream of the second reactant pump, be associated with the second reactant pump, wherein the overpressure valve prevents an increase in the reactant pressure generated by the second reactant pump above the base pressure.

In order to make possible the interaction of the two reactant pumps, especially in the release phases, it is suggested according to an embodiment variant that the first reactant pump, preferably with the nonreturn valve, and the second reactant pump, preferably with the overpressure valve, be arranged parallel to one another. In this embodiment, both reactant pumps may thus be configured to remove reactant to be delivered by same from a reservoir and to deliver it in the direction towards the heating unit and towards the reactant injection unit.

Provisions may be made in an alternative embodiment for the first reactant pump and the second reactant pump to be arranged in series to one another, the first reactant pump being arranged downstream of the second reactant pump. In this embodiment, the first reactant pump thus receives the reactant delivered by the second reactant pump and increases the reactant pressure especially in release phases, so that the switching pressure is reached or exceeded and the reactant injection unit is brought into its open state for releasing reactant. In this embodiment, the overpressure valve is arranged between the second reactant pump and the first reactant pump.

To be able to provide the temperature of the reactant desired for the reactant release operation, on the one hand, and to provide the base pressure needed for preventing an evaporation of reactant in the device according to the present invention itself and the pressure lying above the switching pressure needed for releasing reactant, on the other hand, it is suggested that an actuating device be provided for actuating the heating unit, preferably on the basis of a reactant temperature in the area of the heating unit or/and of the reactant release (injection) unit or/and on the basis of a desired reactant temperature, or/and for actuating the reactant delivery unit, preferably on the basis of a reactant pressure in the area of the heating unit or/and of the reactant injection unit or/and on the basis of a desired reactant pressure.

According to another aspect, the object mentioned in the introduction is accomplished by a method for releasing reactant into the exhaust gas stream of an internal combustion engine by means of a device according to the present invention, comprising the steps:

a) Operating the heating unit for heating reactant delivered by the reactant delivery unit to an overheating temperature, b) operating the reactant delivery unit in a non-release phase such that the reactant pressure at least in the area of the heating unit is at a base pressure above a vapor pressure of the reactant in the area of the heating unit and below a switching pressure of the reactant injection unit for switching the reactant injection unit from the locked state to the open state, c) operating the reactant delivery unit in a release phase such that the reactant pressure is above the switching pressure.

Thus, in the method according to the present invention, the reactant delivery unit is operated during the heating of the reactant to an overheating temperature, i.e., a temperature, which would result in an evaporation of the reactant, for example, under normal pressure conditions, such that the reactant pressure is at least above the vapor pressure of the reactant at this temperature and exceeds the switching pressure in release phases in order to release the reactant into the exhaust gas stream by means of the reactant injection unit brought into the open state at that time.

For example, in step a) the heating unit may be operated such that the temperature of the reactant is in the range of 100° C. to 370° C., preferably in the range of 120° C. to 300° C., more preferably in the range of 130° C. to 250° C., and most preferably in the range of 150° C. to 200° C.

In an advantageous embodiment, the reactant may comprise a urea/water solution. Of course, other reactants, e.g., denoxium or isocyanic acid, may also be used.

In order to ensure that the reactant pressure is high enough during a non-release phase to prevent an evaporation of reactant, but is low enough to ensure that the reactant injection unit remains in its locked state, it is suggested that the reactant delivery unit be operated in step b) in such a way that the reactant pressure is in the range of 1.1-1.2 times the vapor pressure of the reactant in the area of the heating unit or/and that the switching pressure is in the range of 1.1-1.5 times, preferably 1.2-1.4 times the base pressure.

For transferring the reactant injection unit into its open state, provisions may further be made for the reactant delivery unit to be operated in step c) such that the reactant pressure is above the switching pressure by 0.2-2 bar.

In an advantageous embodiment variant of the method according to the present invention, only the second reactant pump is operated for providing the reactant pressure during a non-release phase, i.e., during the carrying out of step b). If reactant shall then be released in a release phase, then additionally, possibly also exclusively, the first reactant pump may be operated during the carrying out of step c) in order to generate the reactant pressure then lying above the switching pressure and to release reactant in a defined quantity and under defined pressure conditions.

In an alternative embodiment variant, both in step b) and in step c) the reactant pressure may be provided exclusively by the first reactant pump.

In the case of a configuration of the first reactant pump as a reciprocating piston pump, it is further suggested according to a particularly advantageous aspect that in step c) the first reactant pump carry out a single piston stroke during a release phase. It can thus be ensured that a sufficiently high pressure is maintained during an entire release phase in order to keep the reactant injection unit in its open state.

To be able to release reactant into the exhaust gas stream of an internal combustion engine over a longer time, it is suggested that while carrying out step a), the reactant delivery unit be alternately operated according to step b) in a non-release phase and according to step c) in a release phase. A cycled operation thus takes place, which makes it possible to release defined quantities of reactant during the release phases, but to ensure that a sufficient reactant pressure can be maintained during the non-release phases for preventing an evaporation of reactant in the device according to the present invention.

To be able to adapt the quantity of the reactant released into the exhaust gas stream to the demand existing for the catalytic reaction to be carried out with it, it is suggested that a duration of the non-release phases or/and a duration of the release phases or/and the reactant pressure in step c) be set as a function of an operating state of an internal combustion engine.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
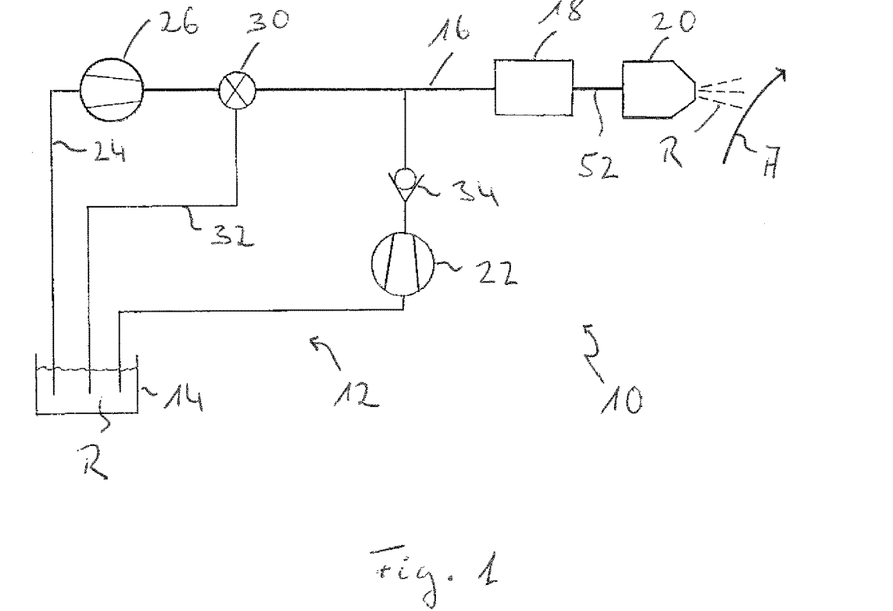
FIG. 1 is a schematic diagram of a device for releasing reactant into the exhaust gas stream of an internal combustion engine with two reactant pumps of a reactant delivery unit acting parallel to one another.

Referring to the drawings, a device for releasing reactant into the exhaust gas stream of an internal combustion engine is generally designated by 10 in FIG. 1. The device 10 comprises a reactant delivery unit 12, by means of which reactant R can be taken from a reactant reservoir 14, i.e., for example, from a storage container, and be delivered via a reactant line 16 to a, for example, electrically energizable heating unit 18. In the heating unit 18, the reactant R delivered by means of the reactant delivery unit 12 and pressurized is heated to an overheating temperature and further delivered to a reactant injection unit 20. The reactant R is released and injected by means of the reactant injection unit into the schematically shown exhaust gas stream A.

In the device 10 shown in FIG. 1, the reactant injection unit 20 operates passively. This means that it is not under the actuation of an actuating device or the like for releasing reactant R into the exhaust gas stream A, but rather switches in a pressure-dependent manner, namely dependent on the reactant pressure in the area of the reactant line 16 and in the area of the reactant injection unit 20 between a locked state preventing the release of reactant and an open state making possible the release of reactant. In this case, the switching pressure, at which the reactant injection unit 20 is switched over between the locked state and the open state, is selected so that it lies above the vapor pressure of the reactant R heated in the area of the heating unit 18. For example, the reactant may be heated by the heating unit 18 to a temperature between 100° C. and 370° C., i.e., to an overheating temperature. At such a temperature, the reactant would already evaporate in the device 10 at normal pressure, i.e., ambient pressure. In order to prevent this, the reactant delivery unit 12 is configured to generate not only the switching pressure needed for releasing reactant R, i.e., when the reactant injection unit 20 is in its locked state, in the area of the reactant line 16 and to provide a, for example, essentially constant base pressure lying above the vapor pressure of the reactant R heated to the overheating temperature thus especially also in the area of the heating unit 18 and of the reactant injection unit 20.

In order to achieve this, the reactant delivery unit 12 comprises, as in the embodiment shown in FIG. 1, a first reactant pump 22 in a first delivery line 24 leading from the reactant reservoir 14 to the reactant line 16 as well as a second reactant pump 26 in a second delivery line 28 leading from the reactant reservoir 14 likewise to the reactant line 16. The delivery lines 24 and 28 thus lead parallel to the reactant line 16, so that the two reactant pumps 22, 26 in this embodiment variant, in principle, operate parallel to one another.

The second reactant pump 26 is, in principle, configured to provide the base pressure that is needed to prevent an evaporation of reactant in the line area lying downstream of the second reactant pump 26. For example, the second reactant pump 26 may be configured as a pump essentially operating in a continuous delivery operation, for example, as a gear pump. To be able to set the base pressure in a defined manner, for example, so that it is in the range of 1.1 to 1.2 times the vapor pressure of the reactant R, especially in the area of the heating unit 18, an overpressure valve 30, which is provided downstream of the second reactant pump in the second delivery line 28, is associated with the second reactant pump 26, for example, but may also be integrated in the second reactant pump 26. From the overpressure valve 30, a recirculating line 32 leads back to the reactant reservoir 14. It can thus be ensured by an essentially continuous operation of the second reactant pump 26 in case of corresponding reactant demand that at least the base pressure lying above the vapor pressure of the reactant R is always maintained in the area of the second delivery line 28 present downstream of the overpressure valve 30, just as in the reactant line 16 and in the system area following it, i.e., in the heating unit 18 and in the reactant injection unit 20, as well as in the area of the first delivery line 24 adjacent to the reactant line 16 and the second delivery line 28. In this case, the delivery capacity or delivery rate of the second reactant pump 26 can be set by corresponding actuation of same and thus be adapted to the actual demand of the reactant and the pressure to be generated.

In a preferred embodiment variant, the first reactant pump 22 is configured as a reciprocating piston pump and is used to generate the switching pressure for transferring the reactant injection unit into the open state for releasing reactant R from the reactant injection unit 20 and maintaining a reactant pressure lying above this switching pressure during a respective release phase. In this case, the first reactant pump can be configured like a metering pump set up for feeding liquid fuel to fuel-operated vehicle heaters with a pump piston capable of reciprocating motion in a pump chamber, as it is well known, for example, from German patent application DE 10 2004 034 231 A1. In order to prevent the reactant, which is under base pressure in a non-release phase, from flowing back during an intake stroke of the first reactant pump 22, into the reactant reservoir 14 via the first reactant pump 22, a nonreturn valve 34, which is arranged downstream of the first reactant pump 22, for example, is also integrated in same, as it is equally known in fuel nozzle pumps of the configuration known from the state of the art, is associated with the first reactant pump 22.

In order to be able to release reactant R by means of the device 10 shown in FIG. 1 intermittently, i.e., in alternating release phases and non-release phases, in a reactant stream which is approximated to a continuous reactant stream and is nevertheless intermittent, the base pressure is maintained and thus an evaporation of the reactant R heated to the overheating temperature in the device 10 itself is prevented during the non-release phases by means of corresponding actuation of the reactant pump 26 in case of a non-energized first reactant pump 22 during non-release phases. The first reactant pump 22 is activated for releasing reactant R, i.e., during the release phases. This first reactant pump generates, for example, in case of configuration of same as a reciprocating piston pump, by the continuous motion of the piston of same and thus ejection of reactant from a pump chamber, a reactant pressure exceeding the switching pressure of the reactant injection unit 20, so that the reactant injection unit 20 is transferred into its open state. This switching pressure is preferably above the base pressure by a factor of 1.1 to 1.5. The reactant pressure generated by the second reactant pump 22 in the release phases is preferably about 0.2 to 2 bar above the switching pressure. Especially in the configuration of the first reactant pump 22 as a reciprocating piston pump, the reactant pressure can be set and maintained by defined actuation of same and thus defined rate of motion of the piston of same and defined number of strokes, so that, during the release phases, not only is the reactant injection unit 20 kept in its open state, but a defined reactant quantity can also be released into the exhaust gas stream A by corresponding setting of the reactant pressure.

In order to achieve a further influence on the quantity of the reactant R released into the exhaust gas stream A, the sequence of release phases and non-release phases can, furthermore, be set by setting the duration of the release phases and setting the duration of the non-release phases. In the case of a higher reactant demand, longer release phases may follow shorter non-release phases, while in case of a lower reactant demand, the non-release phases may be longer, while the release phases may, in principle, be shorter than if there is a higher demand. The maximum duration of the release phase is advantageously determined in coordination with the dimensioning of the first reactant pump 22 such that the first reactant pump 22 configured as a reciprocating piston pump carries out only a single piston stroke during a respective release phase. It can thus be ensured that the reactant pressure lying above the switching pressure can be continuously maintained over the course of such a piston stroke.

It is possible with the device described in reference to FIG. 1 to maintain the reactant R at the base pressure above the vapor pressure, especially in the area of the heating unit 18 and of the reactant injection unit 20 during the non-release phases, wherein this vapor pressure can be determined in each case in association with an overheating temperature to be provided in each case in the area of the heating unit 18, taking into account the vapor pressure curve of a correspondingly used reactant. During the release phases, the reactant R under increased pressure is released in an overheated state from the reactant injection unit 20. A spontaneous expansion of the reactant occurs thereby, which leads to a portion of the reactant R likewise spontaneously evaporating, i.e., thus being introduced in vapor form into the exhaust gas stream A. The remaining, i.e., nonevaporated portion of the reactant R released from the reactant injection unit 20 is released into the exhaust gas stream A in the form of very small droplets with a size in the submicrometer range. On the one hand, this small droplet size supports the fast distribution of the reactant R in the exhaust gas stream and supports the fast evaporation of same first still in droplet form, i.e., in principle, in liquid form of the reactant present, on the other hand, since only a very small reactant volume is to be heated and evaporated in each of these droplets with a very small size. Because of this spontaneously occurring evaporation and the subsequently very rapidly occurring evaporation of the reactant released in droplet form, the residence time of liquid reactant in the area of the reactant injection unit 20 is very short, so that the risk of formation of reaction byproducts, which could lead to a compromise of the functionality of the reactant injection unit 20, is mostly eliminated. A compressed air support for spray generation is thus not necessary, and other steps used for mixing the reactant with the exhaust gas stream A, e.g., providing mixing elements in the downstream area of an exhaust gas duct system, can also be mostly dispensed with.

Figure 2:
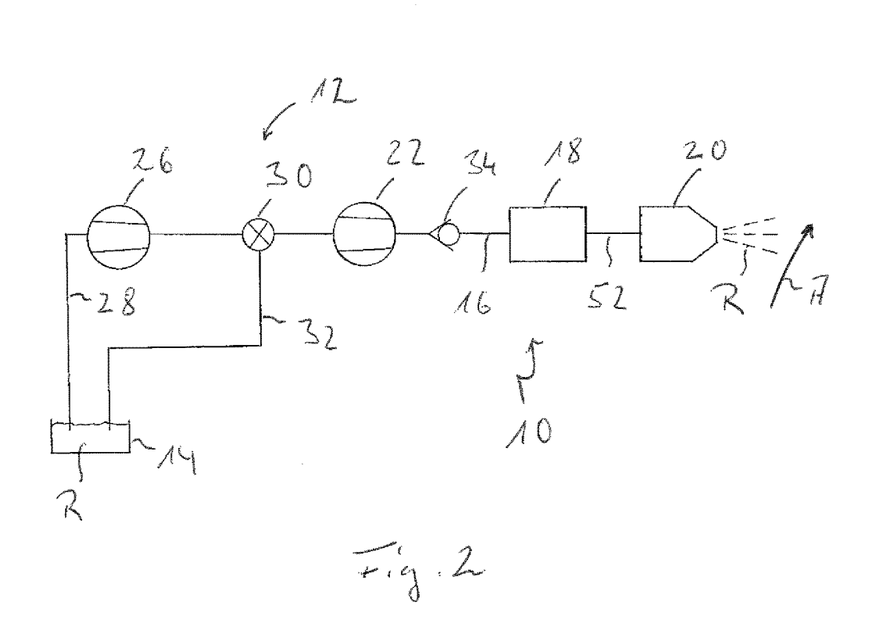
FIG. 2 is a view corresponding to FIG. 1 with two reactant pumps of a reactant delivery pump acting in series to one another.

An alternative embodiment of the device 10 is shown in FIG. 2. In this embodiment, the reactant delivery unit 12 is configured with two reactant pumps 22, 26 which are arranged in series. In this case, the first reactant pump 22 with the nonreturn valve 34 associated with same is arranged in the downstream area of the second delivery line 28, i.e., downstream of the second reactant pump 26 and the following overpressure valve 30. In this embodiment of the device 10, the second reactant pump 26 is operated to provide the base pressure, especially to set up the base pressure in a start phase, in which at first reactant R is delivered to the heating unit 18 and to the reactant injection unit 20 and the heating unit 18 is operated to heat the reactant to the overheating temperature.

The first reactant pump 22, which may also be configured here again as a reciprocating piston pump in the manner described above, is used to increase the reactant pressure generated by the second reactant pump 26 if reactant shall be released into the exhaust gas stream A during a release phase. This means that the first reactant pump 22 must only generate a slight increase in pressure of the reactant, as in the case of the embodiment shown in FIG. 1, which may result in that, based on the base pressure at the beginning of the respective release phase, the switching pressure as well as the pressure then lying above the switching pressure and to be maintained are achieved faster than in a case, in which, as this applies in the embodiment according to FIG. 1, the first reactant pump 22 must first set up the base pressure and operate against this base pressure at the beginning of a respective release phase.

In the embodiment shown in FIG. 2, the pressure in the area between the non-return valve 34 and the reactant injection unit 20 will drop only slightly below the switching pressure during an alternating switching over between release phases and non-release phases. If the reactant injection unit 20 is in its open state during a release phase and the release phase shall be ended, this is carried out by the operation of the first reactant pump 22 being set for continual increasing and maintaining of the reactant pressure. The release of reactant then lasts until the reactant pressure falls below the switching pressure due to continual expansion in the area of the device 10 lying downstream of the nonreturn valve 34 and the reactant injection unit 20 returns into its locked state. Since the nonreturn valve 34 prevents a further expansion of the reactant pressure in the direction towards the first reactant pump 22 and towards the reactant reservoir 14, a further drop in pressure does not occur in the area lying downstream of the nonreturn valve 34. This means that a reactant pressure lying above the base pressure, thus also above the vapor pressure of the reactant R especially in the area of the heating unit 18 and nevertheless lying below the switching pressure remains maintained even during the intermittent reactant release operation, i.e., in the case of alternating switching over between release phases and non-release phases in the line area downstream of the nonreturn valve 34, while essentially the base pressure is maintained in the area lying upstream of the nonreturn valve 34, especially in the area between the nonreturn valve 34 and the second reactant pump 26.

The release of reactant with spontaneous evaporation and generation of very small reactant droplets, i.e., the generation of a so-called flash evaporation, corresponds to the one described above with reference to FIG. 1, so that reference can be made to these explanations.

Figure 3:
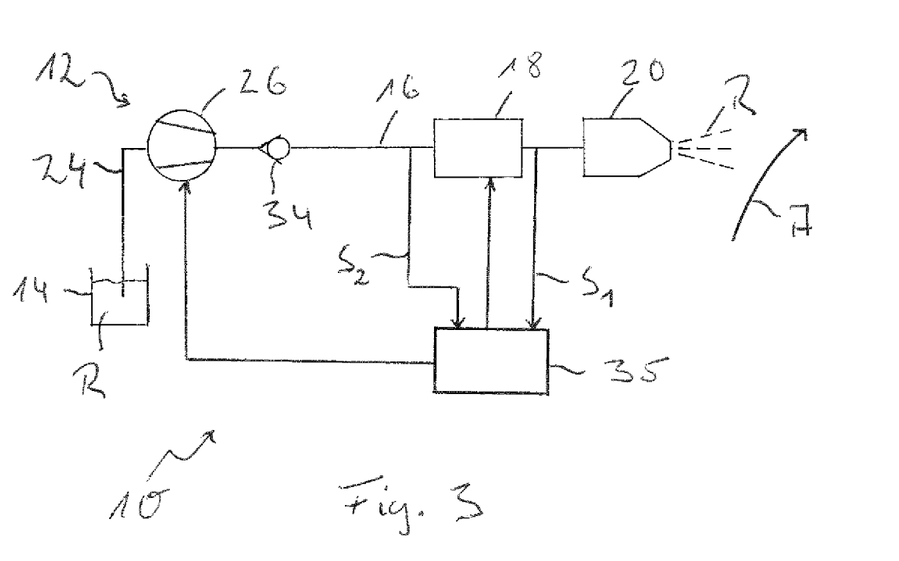
FIG. 3 is a view corresponding to FIG. 1 with a reactant delivery unit with a single reactant pump.

FIG. 3 shows another alternative embodiment. In this embodiment of the device 10, the reactant delivery unit 12 comprises only a single reactant pump, i.e., for example, the first reactant pump 22 configured as a reciprocating piston pump, with which the nonreturn valve 34, which is arranged downstream of same, can again be associated. The first reactant pump 22 receives reactant R from the reactant reservoir 14 via the first delivery line 24 and delivers same in the direction towards the heating unit 18 and towards the reactant injection unit 20. In this case, the first reactant pump 22 is operated during the non-release phases such that the base pressure is set up by one reciprocating motion, and possibly multiple reciprocating motions of the piston of same. In release phases, the pressure in the area of the device 10 following downstream is increased to the switching pressure and a pressure lying above the switching pressure in order to thus eject reactant R. In this case, the first reactant pump 22 may be advantageously configured again as a reciprocating piston pump, so that the necessary pressure is set up during a respective release phase with a single, fully or even only partly carried out piston stroke, on the one hand, and, on the other hand, the necessary quantity of reactant is subsequently delivered in order to maintain this pressure and to introduce reactant into the exhaust gas stream A in the delivered amount.

In this embodiment as well, the nonreturn valve 34 arranged downstream of the first reactant pump 22 or possibly integrated in same ensures that the pressure especially in the area of the heating unit 18 and of the reactant injection unit 20 does not drop below the base pressure, especially not below the vapor pressure of the reactant R heated to overheating temperature. In particular, the pressure in the area downstream of the nonreturn valve 34 will, also in this embodiment, be only slightly below the switching pressure of the reactant injection unit 20 during the non-release phases. During these non-release phases, it can be ensured by corresponding operation of the first reactant pump 22 that the base pressure lying above the vapor pressure of the reactant, but below the switching pressure is set up in the line area upstream of the nonreturn valve 34.

It should be pointed out that in the configuration of the device 10 according to the present invention, the heating unit 18 may have any desired configuration, and, for example, it may comprise a heat conductor integrated in a line section, possibly also a heat conductor around which the reactant can flow and thus which can be brought into direct thermal interaction therewith, which heat conductor can be energized by actuation of an actuating device 35, to heat the reactant to the overheating temperature especially in the area close to the reactant injection unit 20. In this connection, a temperature control, for example, may take place, for which, for example, a temperature sensor may also be provided in the area of the heating unit 18, i.e., e.g., integrated in same or arranged slightly upstream or downstream thereof to detect the temperature of the reactant and to input corresponding information via a signal line S1 into the actuating device. The heating unit 18 is advantageously very close to the reactant injection unit 20, for example, it is provided directly adjacent to same. It is thus ensured that the volume of the overheated reactant is kept as low as possible and the residence time of the reactant at the overheating temperature is also as short as possible and a heat-related aging of the reactant can thus be prevented. In principle, the heating unit 18 could also be divided into a plurality of areas, for example, an area directly adjacent to the reactant injection unit 20, possibly also integrated in same, as well as another area lying upstream.

An output signal of a pressure sensor can be sent via a signal line S2 to the actuating device 35 in order to also provide information about the reactant pressure lying in the area of the heating unit 18 and of the reactant release unit (reactant injection unit) 20. Based on the information provided via the signal lines S1 and S2, the actuating device 35 can then actuate the heating unit 18 to provide or maintain the desired overheating temperature of the reactant R, on the one hand, and can actuate the reactant delivery unit 12, in the exemplary embodiment of FIG. 3 only the first reactant pump 26, in the exemplary embodiment of FIGS. 1 and 2 both reactant pumps 22, 26, to set and maintain the base pressure during the non-release phases, on the one hand, and, on the other hand, to set and maintain the switching pressure and the pressure lying above the switching pressure, when the reactant R shall be released during the release phases.

The actuating device 35 may, further, be fed, for example, information about the operating state of an internal combustion engine, to be able to correspondingly set the pressure conditions based on it and to be able to release the desired quantity of reactant adapted to the operating state of the internal combustion engine. The functionality of the actuating device 35 may, for example, be integrated directly into an engine control device as well.

In an alternative embodiment, the pressure sensor could be arranged in the area lying downstream of the heating unit 18, i.e., for example, between the heating unit 18 and the reactant release unit (reactant injection unit) 20. An integration of the sensors into the heating unit 18 or/and the reactant release unit (reactant injection unit) 20 is also possible.

Various embodiments of a passively operating, i.e., pressure-dependent, switching reactant injection unit 20 are described below with reference to FIGS. 3 and 4. The reactant injection units 20 shown in FIGS. 4 and 5 may be mounted on an injector fitting provided on an exhaust system of an internal combustion engine in order to release the reactant released therefrom into the exhaust gas stream routed in the exhaust system. If necessary, an element for secondary dispersion, generally also called mixing element, may be provided in the exhaust system downstream of this injection area. This element may have impact surfaces, on which the reactant droplets appearing thereon burst and the surfaces of which are heated by the exhaust gas stream, to further support the evaporation of reactant.

Figure 4:
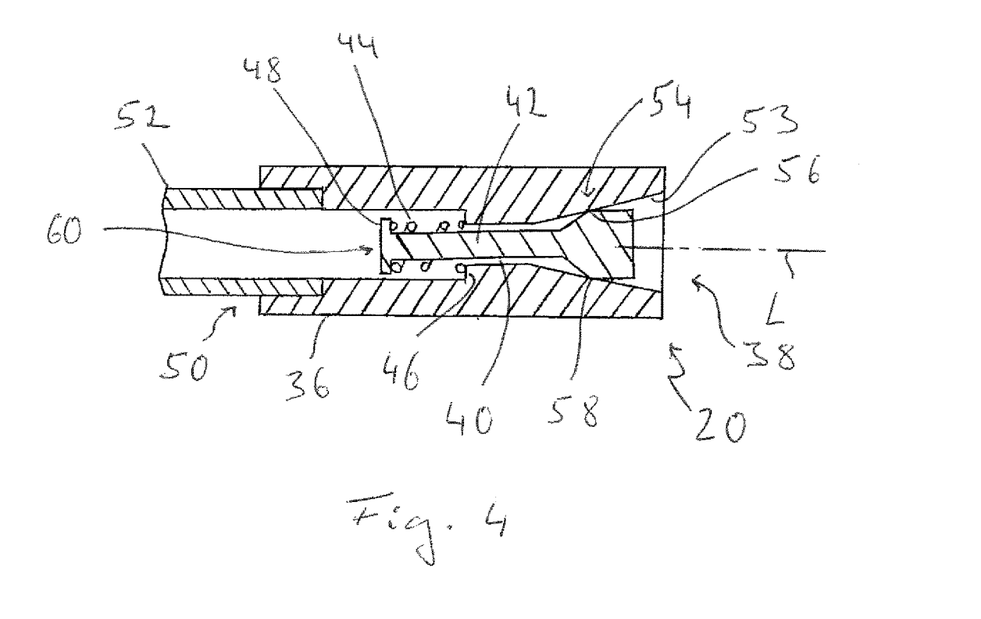
FIG. 4 is a simplified longitudinal sectional view of a reactant injection unit operating passively, i.e., in a pressure-controlled manner.

The reactant injection unit 20 shown in FIG. 4 comprises a housing 36 with a release opening area 38 to be positioned facing the exhaust gas stream. In an opening 40 formed, for example, centrally in the housing 36 and traversing same, a locking element 42 is mounted in a movable manner in the direction of a housing longitudinal axis L. The locking element 42 is prestressed in the direction towards a locked position of the reactant injection unit 20 corresponding to the locked state of same. For this purpose, a, for example, prestressing spring 14, configured as a compression coil spring, is supported at a step-like expansion 46 of the central opening, on the one hand, and at a support area 48 of the locking element 42, on the other hand, so that the locking element 42 in the view of FIG. 4 is prestressed to the left and thus in the direction into the housing 36. A reactant line 52, leading, for example, from the heating unit 18 can be connected at a connection area 50 of the housing 36 facing away from the release opening area 38.

A locking element seat 54, extending in a ring-like manner about the housing longitudinal axis L, with a locking element seat closing area 56, correspondingly extending in a ring-like manner, is provided in a, for example, conically expanding area 53 of the central opening 40. A corresponding locking element closing area 58, for example, in the form of an edge area extending in a ring-like manner, is formed at the locking element 42 itself in association with the locking element seat closing area. When the locking element 42 is positioned in the locked position, the locking element closing area 58 lies on the locking element seat closing area 56 of the locking element seat 54, so that the release of reactant R from the reactant injection unit 20 is prevented by continuous contacts with no interruptions in the circumferential direction about the housing longitudinal axis L between the locking element 42 and the housing 36.

The locking element 42 is exposed to the pressure of the reactant also present in the opening 40, in principle, in the housing 36. This pressure acts on all surface areas of the locking element 42 that are exposed in axial view toward the interior of the housing 36, which in their entirety provide a pressurization surface 60. If the reactant pressure inside the housing 36 exceeds the prestressing force of the prestressing spring 44, obviously taking into account the pressure acting on the locking element from the other side, i.e., it is at least close to the switching pressure, then the prestressing element 42 can be moved to the right in FIG. 4 against the prestressing action of the prestressing spring 44 in order to thus reach an open position corresponding to the open state of the reactant injection unit 20. The extent of the movement depends on the level of the reactant pressure. The higher the reactant pressure, the stronger is the force acting on the locking element 42 and moving this element against the prestressing action of the prestressing spring 44. In case of such movement of the locking element 42, the locking element closing area 58 lifts from the locking element seat closing area 56, so that a ring-like flow-through area is formed between same. The flow cross-sectional surface of the flow-through area depends on the extent of the movement of the locking element 42 and thus also on the reactant pressure. It is seen in FIG. 4 that the then forming flow cross section increases in flow direction toward this flow-through area formed between the locking element seat closing area 56 and the locking element closing area 58, so that the area of greatest flow resistance is formed in this flow-through area. The spontaneous evaporation and generation of very small droplets of the reactant mentioned above thus occurs very close to this flow-through area and in flow direction directly following this flow-through area. Since no further throttle points follow, the entire, thus released reactant can reach the exhaust gas stream. No residual volume, in which a deposit of the reactant can occur because of a decomposition of urea, is thus present.

Figure 5:
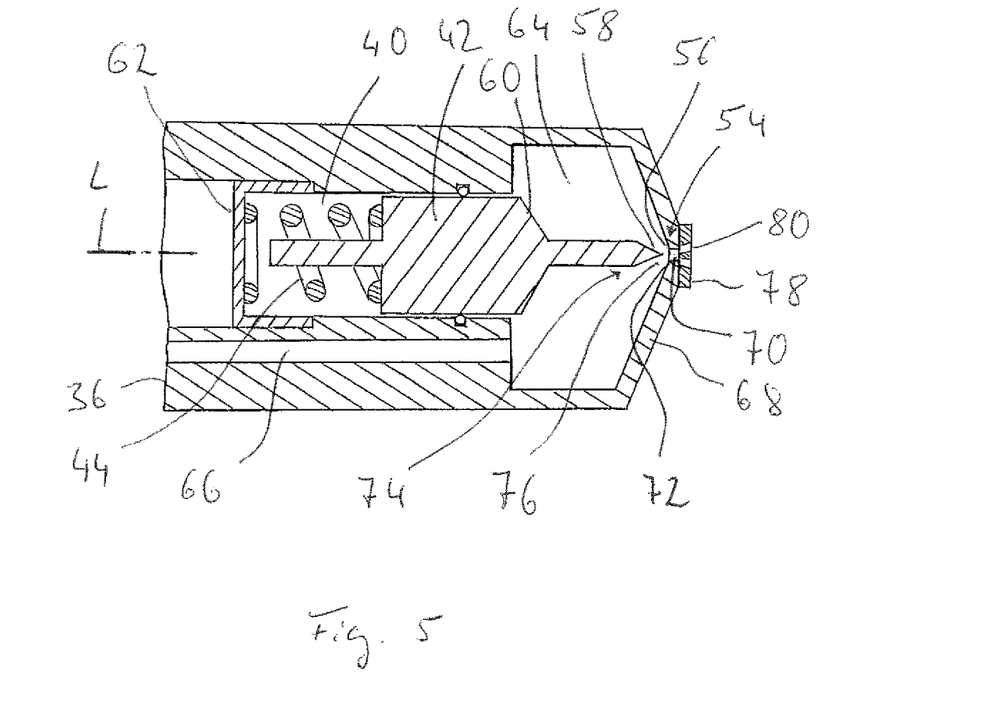
FIG. 5 is a view corresponding to FIG. 4 of an alternative embodiment of a passively acting, i.e., pressure-controlled reactant injection unit.

In the embodiment of the reactant injection unit 20 shown in FIG. 5, the locking element 42 which is mounted displaceably in the central opening 40 of the housing 36 in the direction of the housing longitudinal axis L is prestressed in the opposite direction. The locking element 42 here is also under the prestress of the prestressing spring 44, which is supported at the locking element 42, on the one hand, and at a support element 62 inserted into the central opening 40 in a fixed manner.

A release chamber 64 for the reactant R to be released, into which a duct 66 leading the reactant R, for example, from the heating unit 18 opens, is formed in an axial end area of the housing 36. An opening 70, via which the release chamber 64 is, in principle, open to the outside, is formed in a dome-like area 68 of the housing 36. In this embodiment, an edge area 72 surrounding the opening 70 forms the locking element seat closing area 56 of the locking element seat, which is generally designated by 54. The locking element closing area 58, which is in contact with the locking element seat closing area 54 in the locked position and thus blocks the release chamber 64 against the release of reactant R, is formed at a tip area 74 of the locking element 42 being supported at the edge area 72 in the locked position of the locking element 42.

The flow-through area 76 already explained above with reference to FIG. 4, which is represented here as an essentially ring-like cross-sectional surface area as well and through which the released reactant R reaches the area of the opening 70, is formed between the locking element seat closing area 56 and the locking element closing area 58 in the open position shown in FIG. 5, in which the locking element 42 is moved back by the reactant in the interior of the housing 36 acting on the pressurization surface 60 of same.

A reactant release nozzle unit 78, generally also called orifice disk, overlapping the opening 70, is provided on the outside of the housing 36. This reactant release nozzle unit comprises a plurality of nozzle openings 80 interacting with the opening 70 and releasing the reactant to the outside. In order to achieve a nozzle action here, the flow resistance of the reactant release nozzle unit 78, i.e., the flow resistance provided by all nozzle openings 80, for the reactant R is greater than the flow resistance provided in the area of the passage area 76 when the locking element 42 is positioned in the open position. This can be achieved, for example, by the entire flow cross section of all nozzle openings 80 being smaller than the flow cross section in the passage area 76.

When the locking element 42 is positioned in the open position, if the overheated reactant R, which is at first still under higher pressure, reaches the area of the opening 70 through the passage area 76, then a slight expansion of the reactant pressure may already occur. However, a complete expansion only occurs if the reactant R passed through the opening 70 and the nozzle openings 80 is released into the exhaust gas stream. A substantial advantage of this embodiment is that the configuration of the spray mist is essentially determined by the configuration of the reactant release nozzle unit 78 and is less affected by the configuration and positioning of the locking element 42. This means that the release characteristic, i.e., the spatial configuration of the spray mist, is, however, not affected thereby for a great variety of reactant pressures and a great variety of positionings of the locking element 42 associated therewith, in the open position of which the quantity of the released reactant may vary.

Even though another nozzle area with greater flow resistance follows the flow-through area 76 in this embodiment of the reactant injection unit 20, i.e., in principle, there is a residual volume that is essentially also provided by the volume of the opening 70, in which released and partly evaporated reactant may accumulate, the risk of formation of reactant deposits is comparatively low, since this residual volume is directly adjacent to that area, in which the reactant is introduced into the exhaust gas stream.

While specific embodiments of the invention have been shown and described in detail to illustrate the application of the principles of the invention, it will be understood that the invention may be embodied otherwise without departing from such principles.

What is claimed is:

1. A device for releasing reactant into an exhaust gas stream of an internal combustion engine, the device comprising:
   a reactant injection unit;
   a reactant delivery unit for delivering reactant from a reactant reservoir to the reactant injection unit, wherein the reactant injection unit is configured to switch, as a function of a reactant pressure generated by the reactant delivery unit, between an open state for releasing reactant and a locked state for preventing a release of reactant; and
   a heating unit for heating reactant delivered by the reactant delivery unit to the reactant injection unit, wherein the reactant delivery unit comprises:
   a first reactant pump operatively connected to the reactant injection unit, the first reactant pump being configured to generate a reactant pressure lying above a switching pressure and being configured to deliver reactant to the reactant injection unit at said reactant pressure lying above a switching pressure for switching the reactant injection unit from the locked state into the open state and the first reactant pump; and
   a second reactant pump operatively connected to the reactant injection unit, the second reactant pump being configured to generate a reactant base pressure of reactant delivered to the injection unit and in the area of the heating unit, which reactant base pressure is at a pressure level below the switching pressure and above a vapor pressure of the reactant in an area of the heating unit.

2. A device in accordance with claim 1, wherein
   the first reactant pump and the second reactant pump are operatively arranged in series to one another, the first reactant pump being arranged downstream of the second reactant pump.

3. A device in accordance with claim 1, further comprising an actuating device configured to:
   actuate the heating unit on the basis of a reactant temperature in an area of the heating unit and/or of the reactant release unit or on the basis of a desired reactant temperature; and/or
   actuate the reactant delivery unit on the basis of a reactant pressure in an area of the heating unit or/and of the reactant injection unit or/and on the basis of a desired reactant pressure and to deliver reactant to the reactant injection unit at said reactant pressure lying above the switching pressure to switch the reactant injection unit from the locked state into the open state and to generate a reactant base pressure of reactant delivered to the injection unit and in the area of the heating unit, which reactant base pressure is at a pressure level below the switching pressure and above a vapor pressure of the reactant in an area of the heating unit.

4. A device in accordance with claim 1, further comprising an actuating device configured to:
- actuate the heating unit to heat reactant delivered by the reactant delivery unit to an overheating temperature;
- actuate the reactant delivery unit in a non-release phase comprising actuating the second reactant pump to generate the reactant base pressure such that the reactant base pressure prevails at least in an area of the heating unit and the reactant delivery unit, the reactant base pressure being above a vapor pressure of the reactant in the area of the heating unit and below the switching pressure of the reactant injection unit such that the reactant injection unit is in the locked state; and
- actuating the reactant delivery unit, with the actuating device, in a release phase comprising actuating at least the first reactant pump to generate the reactant pressure lying above the switching pressure such that the reactant pressure lying above the switching pressure prevails at least in an area of the heating unit and the reactant delivery unit to switch the reactant injection unit from the locked state into the open state and to deliver reactant to the reactant injection unit at said reactant pressure lying above a switching pressure.

5. A device in accordance with claim 4, wherein the reactant injection unit comprises a locking element which can be adjusted as a function of the reactant pressure between a locked position, to provide the locked state and an open position to provide the open state.

6. A device in accordance with claim 5, wherein the locking element has a pressurization area exposed to the reactant pressure, and/or a prestressing unit with a prestressing spring for prestressing the locking element in the locked position against the reactant pressure acting on the pressurization area of the locking element, which pressurization area is exposed to the reactant pressure, is associated with the locking element.

7. A device in accordance with claim 5, wherein:
- a locking element seat with a locking element seat closing area is associated with the locking element;
- with the locking element positioned in the locked position, the locking element with a locking element closing area is in contact with the locking element seat closing area in an essentially fluid-tight manner; and
- with the locking element positioned in the open position, a flow-through area is formed between the locking element and the locking element seat.

8. A device in accordance with claim 7, wherein in the reactant injection unit, with the locking element positioned in the open position, no area with a greater flow resistance for the reactant than in the flow-through area follows the reactant flow-through area.

9. A device in accordance with claim 7, wherein the reactant injection unit has, downstream of the reactant flow-through area, a reactant release nozzle unit with greater flow resistance for the reactant than in the flow-through area.

10. A device in accordance with claim 4, wherein:
- the first reactant pump comprises a reciprocating piston pump; or
- a nonreturn valve is arranged downstream of the first reactant pump and upstream of the heating unit and is associated with the first reactant pump; or
- the first reactant pump comprises a reciprocating piston pump and a nonreturn valve is arranged downstream of the first reactant pump and upstream of the heating unit and is associated with the first reactant pump.

11. A device in accordance with claim 4, wherein:
- the second reactant pump comprises a gear pump;
- an overpressure valve is arranged downstream of the second reactant pump and is associated with the second reactant pump; and
- the overpressure valve prevents an increase in the reactant pressure generated by the second reactant pump above the base pressure.

12. A device in accordance with claim 11, wherein the overpressure valve is arranged between the second reactant pump and the first reactant pump.

13. A method for releasing reactant into an exhaust gas stream of an internal combustion engine, the method comprising the steps of:
- providing a device comprising a reactant injection unit, a reactant delivery unit for delivering reactant from a reactant reservoir to the reactant injection unit, wherein the reactant injection unit is switchable, as a function of a reactant pressure generated by the reactant delivery unit, between an open state for releasing reactant and a locked state for preventing a release of reactant and a heating unit for heating reactant delivered by the reactant delivery unit to the reactant injection unit;
- providing the reactant delivery unit comprising a first reactant pump operatively connected to the reactant injection unit and configuring the first reactant pump to generate a reactant pressure lying above a switching pressure and delivering reactant to the reactant injection unit at said reactant pressure lying above the switching pressure to switch the reactant injection unit from the locked state into the open state; and
- providing the reactant delivery unit comprising a second reactant pump operatively connected to the reactant injection unit and configuring the second reactant pump to generate a reactant base pressure of reactant delivered to the injection unit and in the area of the heating unit, which reactant base pressure is at a pressure level below the switching pressure and above a vapor pressure of the reactant in an area of the heating unit.

14. A method in accordance with claim 13, further comprising the steps of:
- providing an actuating device;
- actuating the heating unit, with the actuating device, to heat reactant delivered by the reactant delivery unit to an overheating temperature;
- actuating the reactant delivery unit, with the actuating device, in a non-release phase such that the reactant pressure of reactant delivered to the injection unit and at least in an area of the heating unit is at a base pressure above a vapor pressure of the reactant in the area of the heating unit and below a switching pressure of the reactant injection unit such that the reactant injection unit is in the locked state; and
- actuating the reactant delivery unit, with the actuating device, in a release phase such that the reactant pressure is above the switching pressure.

15. A method in accordance with claim 14, wherein the step of operating the heating unit includes operating the heating unit such that a temperature of the reactant is in a range of 100° C. to 370° C.

16. A method in accordance with claim 14, wherein the reactant comprises a urea/water solution.

17. A method in accordance with claim 14, wherein in step of operating the reactant delivery unit in a non-release phase, the reactant delivery unit is operated such that the reactant pressure is in a range of 1.1-1.2 times a vapor pressure of the reactant in the area of the heating unit or/and the switching pressure is in the range of 1.1-1.5 times a base pressure.

18. A method in accordance with claim 14, wherein in the step of operating the reactant delivery unit in a release phase, the reactant delivery unit is operated such that a reactant pressure is above the switching pressure by 0.2-2 bar.

19. A method in accordance with claim 14, wherein:
only the second reactant pump is operated for providing the reactant pressure and in the step of operating the reactant delivery unit in a non-release phase, at least the first reactant pump is operated for providing the reactant pressure.

20. A method in accordance with claim 19, wherein:
the reactant pump comprises a reciprocating piston pump and a nonreturn valve is arranged downstream of the reactant pump and upstream of the heating unit and is associated with the reactant pump; and
the reactant pump carries out a single piston stroke during a release phase.

21. A method in accordance with claim 14, wherein while carrying out the step of operating the heating unit for heating reactant, the reactant delivery unit is alternately operated according in a non-release phase and in a release phase.

22. A method in accordance with claim 21, wherein in the step of operating the reactant delivery unit in a release phase such that the reactant pressure is above the switching pressure a duration of the non-release phases or/and a duration of the release phases or/and the reactant pressure is set as a function of an operating state of an internal combustion engine.

23. A method in accordance with claim 14, wherein:
said step of actuating the reactant delivery unit, with the actuating device, in a non-release phase comprises actuating the second reactant pump to generate the reactant base pressure lying below the switching pressure and above the vapor pressure of the reactant in an area of the heating unit; and
said step of actuating the reactant delivery unit, with the actuating device, a release phase comprises actuating at least the first reactant pump to generate the reactant pressure lying above the switching pressure to switch the reactant injection unit from the locked state into the open state and to deliver reactant to the reactant injection unit at said reactant pressure lying above a switching pressure.

24. A device for releasing reactant into an exhaust gas stream of an internal combustion engine, the device comprising:
a reactant injection unit;
a reactant delivery unit for delivering reactant from a reactant reservoir to the reactant injection unit, wherein the reactant injection unit is configured to switch, as a function of a reactant pressure generated by the reactant delivery unit, between an open state for releasing reactant and a locked state for preventing a release of reactant; and
a heating unit for heating reactant delivered by the reactant delivery unit to the reactant injection unit, wherein:
the reactant delivery unit comprises a first reactant pump for delivering reactant to the reactant injection unit, the first reactant pump being configured to generate a reactant pressure lying above a switching pressure for switching the reactant injection unit from the locked state into the open state;
a nonreturn valve is arranged downstream of the first reactant pump and upstream of the heating unit and is associated with the first reactant pump;
the reactant delivery unit further comprises a second reactant pump for providing reactant with a base pressure lying below the switching pressure and above a vapor pressure of the reactant in the area of the heating unit;
an overpressure valve is arranged downstream of the second reactant pump and is associated with the second reactant pump; and
the first reactant pump with the nonreturn valve and the second reactant pump with the overpressure valve are operatively arranged parallel to one another.

* * * * *